H. K. & H. L. FAIRALL & J. R. COOK.
WATER MEASURING DEVICE.
APPLICATION FILED APR. 9, 1908.
918,834.
Patented Apr. 20, 1909.
3 SHEETS—SHEET 3.
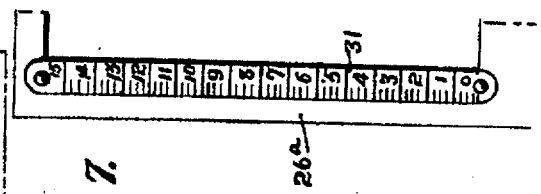
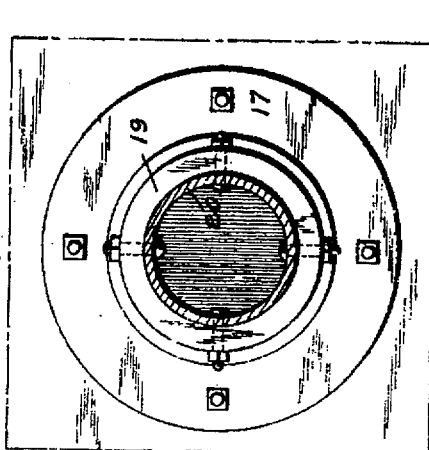
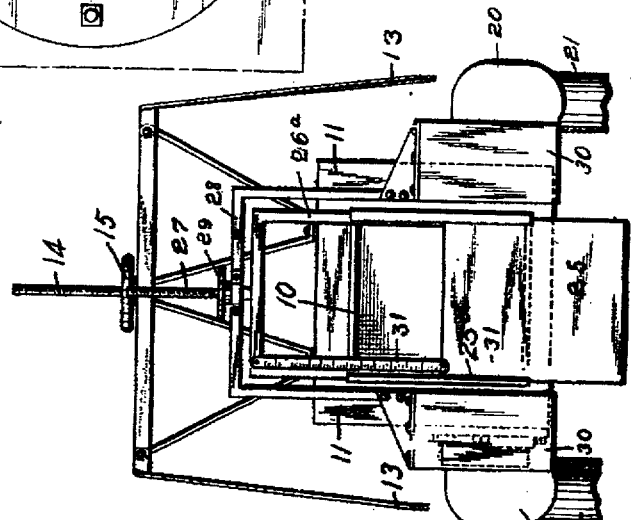
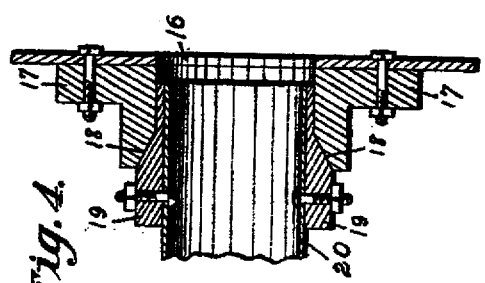
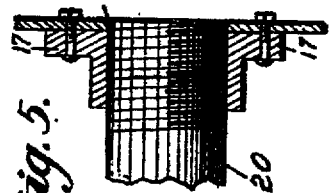
Witnesses.
F. C. Dahlberg
A. G. Hague
Inventors
Harry K. Fairall
Howard L. Fairall
John R. Cook
by Druy & Lane Attys.

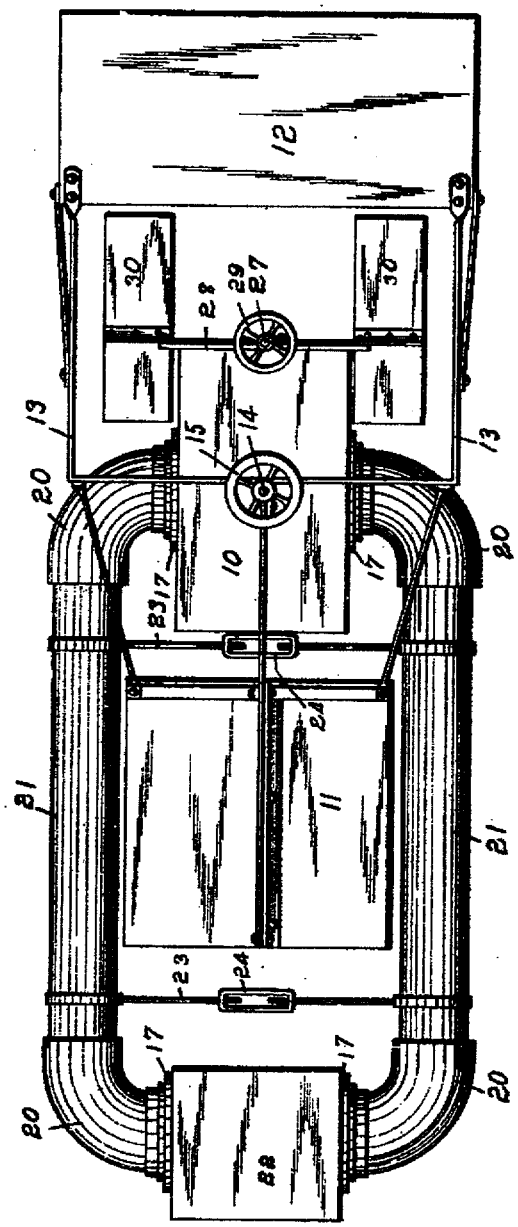

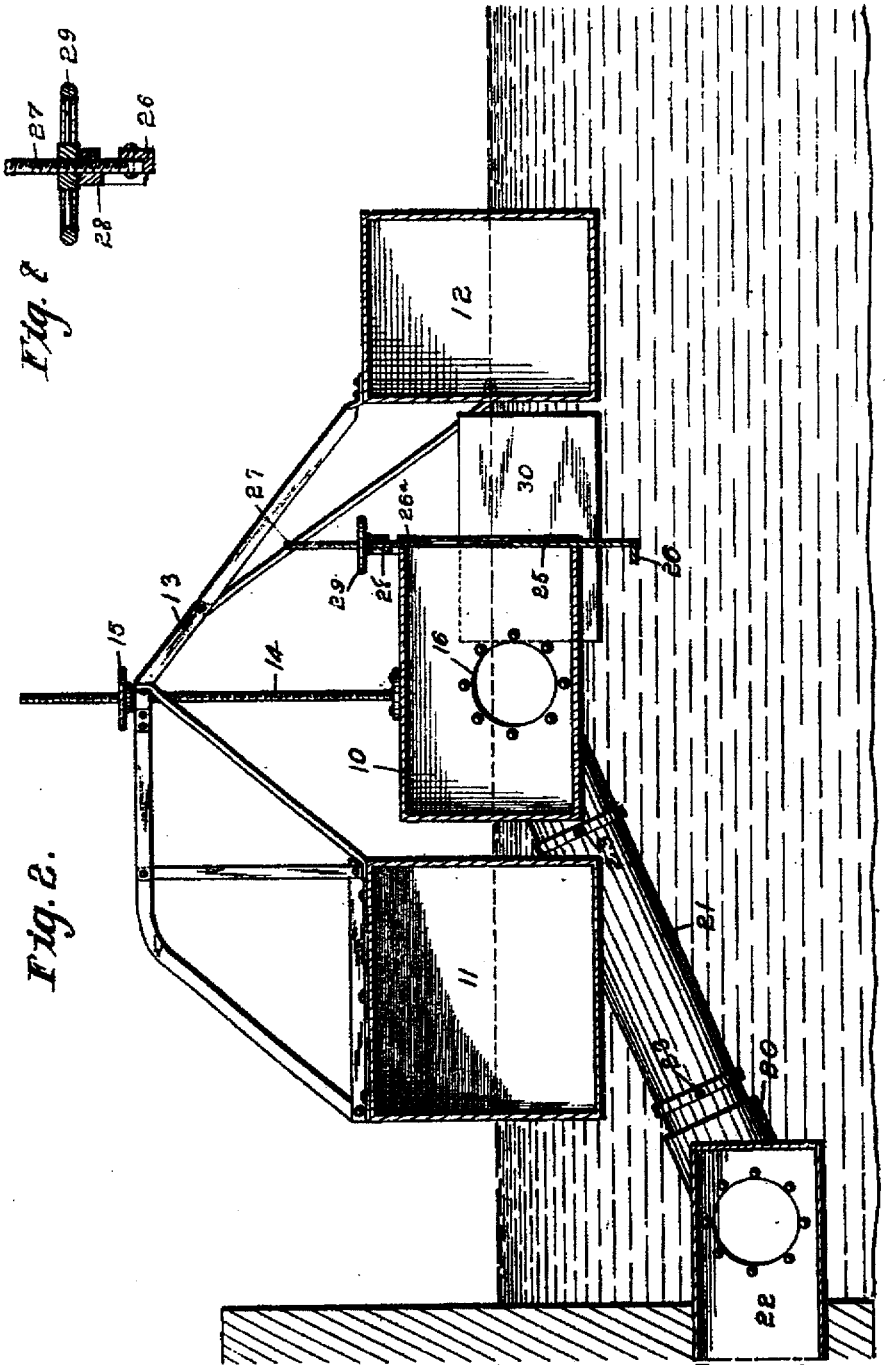

UNITED STATES PATENT OFFICE.

HARRY K. FAIRALL, HOWARD L. FAIRALL, AND JOHN R. COOK, OF HIGHLAND, CALIFORNIA.

WATER-MEASURING DEVICE.

No. 918,834.  Specification of Letters Patent.  Patented April 20, 1909.

Application filed April 9, 1908. Serial No. 426,166.

*To all whom it may concern:*

Be it known that we, HARRY K. FAIRALL, HOWARD L. FAIRALL, and JOHN R. COOK, citizens of the United States, residing at Highland, in the county of San Bernardino and State of California, have invented a new and useful Water-Measuring Device, of which the following is a specification.

The object of our invention is to provide a device of this kind, of simple, durable and inexpensive construction, especially designed for use in conducting water from a canal, reservoir, or the like, to a point of discharge, such for instance as an irrigating ditch, and to accurately measure the quantity of water thus conducted.

More specifically it is our object to provide a device of this kind, in which water is removed from the surface of the reservoir or canal, instead of from a point below the surface, so that pressure upon the water will at all times be equal.

A further object is to provide a device of this kind which may be quickly and easily adjusted to permit the flow of any desired volume of water.

A further object is to provide a device of this kind so arranged that in case of accident, and in the event that the floats for supporting the weir box should become submerged, the receiving opening therein will be automatically closed to prevent further flow of water.

A further object is to provide independent floats for supporting the weir gate at the predetermined distance below the water level, for the reason that the weight of the weir gate is constant and unchanging and the weight of the weir box, and other parts, varies when the water level with the reservoir or canal is changed, that is to say when the water level is low the water pipes are nearly horizontal and require more lifting power to hold their free ends up than when the water is high and the pipes are nearly vertical, hence, by having the weir gate supported on independent floats, the quantity of water flowing over the weir gate is maintained constant and unchanging, even though the weir box itself should be submerged to a greater or less degree.

Our invention consists in the construction, arrangement and combination of the various parts of the device, whereby the objects contemplated are attained, as hereinafter more fully set forth, pointed out in our claims, and illustrated in the accompanying drawings, in which—

Figure 1 shows a top or plan view of a water measuring device embodying our invention. Fig. 2 shows a central longitudinal sectional view of same. Fig. 3 shows a front end elevation of the weir box, and connected parts, the forward float being removed. Fig. 4 shows an enlarged detail sectional view illustrating one of the universal joints for connecting the conducting pipes with the sides of the weir box. Fig. 5 shows a similar view of the modified form of same. Fig. 6 shows a sectional view of the parts shown in Fig. 4, looking toward the right. Fig. 7 shows a detail view illustrating the scale, and Fig. 8 shows a detail sectional view illustrating the means for adjusting the weir gate relative to its supporting frame.

Referring to the accompanying drawings, we have used the reference numeral 10 to indicate the weir box. This box is open at its front, and the weir gate to be hereinafter described is mounted at the front thereof. The weir box is supported at a point near the water level, by means of two floats, the rear one being indicated by the numeral 11, and the front one by the numeral 12. These floats are of substantially the same area so that they have approximately the same carrying capacity. They are rigidly connected by means of a frame 13.

Fixed to the top of the weir box 10 is a screw threaded shaft 14 which is passed through the frame 13, and provided with a screw threaded hand wheel 15 above the frame 13. At each side of the weir box is a round opening 16 and on the outer surface of the weir box, adjacent to said opening, is an annular collar 17 having a tapered outer end 18. Rotatably mounted in said annular collar 17 is an annular collar 19 tapered to fit against the tapered shoulder 18. A pipe 20 is inserted in the annular collar 19, and said parts are so arranged that a water-tight joint will be provided between the collars 17 and 19, and yet the collar 19 will be permitted to rotate freely relative to the collar 17. There is a similar device on each side of the weir box, and the pipes 20 on both sides are extended first outwardly from the weir box, then rearwardly parallel with each other at 21, and at their rear ends they are curved inwardly toward each other, and connected with a discharge box 22 by means of the same kind of joints as before described in connection with the weir box.

In order to hold the ends of the pipes 20 firmly in position relative to the weir box, and the discharge box, we provide two straps 23 connected to the straight portions of the pipes 21 and each strap is provided with a turn-buckle 24 so that the said pipes are adjustably held in position relative to the said boxes, thus making connections between the boxes and the pipes that will permit the pipes to rotate relative to the boxes, and yet form water-tight joints.

The water that passes through the weir box enters these pipes and flows downwardly and rearwardly through them and then enters the discharge box 22, which discharge box is preferably fixed in position in the wall or dam of the reservoir or canal. The weir gate comprises a flat piece of metal 25 slidingly mounted in suitable guides 25ª at the open front of the weir box. All of the water that enters the weir box must flow over the top of the weir gate. The bottom of the weir gate is provided with a rearwardly extending flange 26. Connected to the top of the weir gate is a frame 26ª which is slidingly mounted in the guides 25ª on the weir box, and which is provided with a screw threaded rod 27 at its upper end. This rod is slidingly mounted in the frame 28, and above the frame 28 is a screw threaded hand wheel 29 mounted on the screw threaded rod, to provide for supporting the weir gate in any position of its adjustment relative to the weir box. However, the weir gate may be freely moved upwardly relative to the weir box on account of its sliding connection with the frame 28. The said frame 28 is fixed to and supported by two floats 30, which are arranged at the sides of the weir box and in the rear of the float 12.

In order to accurately determine the amount of water passing over the weir gate, we provide a scale 31 attached to the weir gate 25 and extended above the weir gate. In this way the amount of water passing over the weir gate may be determined by glancing at the mark on the scale that is at the water level, as the amount passing over the weir gate represents the difference between zero mark on the scale and the mark which is at the water level.

In the modified form shown on Fig. 5, the collar secured to the outer surface of the weir box is provided with a screw threaded opening, and the pipe 20 is screw threaded and inserted in said opening. This screw threaded connection forms a water-tight joint and at the same time permits the pipe 20 to rotate a part of a revolution relative to the collar, and thus a connection is formed which is somewhat cheaper to construct than the preferred form illustrated in Fig. 4.

In practical use, the discharge box is placed in position projecting through the dam or wall of the reservoir or canal, so that water flowing through said discharge box will enter an irrigating ditch or other point of discharge. The floats each being arranged on opposite sides of the weir box will support the weir box in horizontal position, no matter how much the said floats are submerged in the water. This is very important in accurate measurement of the water.

When the conducting pipes are in an approximately vertical position, their weight upon the weir box will be less than when they approach a substantially horizontal position, hence, the weir box itself is submerged different distances below the water surface and for this reason, we provide the independent floats for the weir gate, and the weir gate is supported wholly by said independent floats, which floats have only the constant and unchanging weight of the weir gate itself to support.

As the water rises and falls within the reservoir, or canal, the floats will support the weir gate in substantially the same position relative to the water level, the pivoted joints at the ends of the pipes being permitted to turn in their bearings sufficiently to permit this. In the event that the floats that support the weir box should become damaged, and sink in the water, then as the weir box is submerged, it will strike the lower end 26 of the weir gate and hence, the gate will be closed over the front of the weir box and will be carried down with the weir box, but the opening therein will be closed to prevent the flow of water through the weir box.

When the device is first placed in the water, the floats will instantly assume their normal positions with relation to the water level, then by having the scale of the weir gate adjustable, the operator may quickly and easily adjust the scale so that it will be in proper position relative to the water level, and in the event that the floating support of the weir gate should at any time be normally submerged at a different level, then the scale may be re-adjusted.

We claim as our invention.

1. In a device of the class described, the combination of a weir box, a floating device for supporting the weir box, a weir gate capable of adjustment relative to the weir box and an independent floating device for supporting the weir gate.

2. In a device of the class described, the combination of a weir box, a floating device for supporting the weir box, a weir gate capable of adjustment relative to the weir box, an independent floating device for supporting the weir gate, and a scale carried by the independent floating device for the weir gate.

3. In a device of the class described, the combination of a weir box, a floating device for supporting the weir box, a weir gate capable of adjustment relative to the weir box, an independent floating device for supporting the weir gate, a scale carried by the independent floating device for the weir gate, and means for adjusting the scale and weir gate jointly relative to the floating device for the weir gate.

4. In a device of the class described, the combination of a weir box, a floating support for it, a weir gate, an independent floating support for the weir gate, a screw threaded rod connected with the weir gate and extended upwardly through the floating support for the weir gate, and a screw threaded hand wheel on said rod designed to rest upon the support for the weir gate, to permit the gate to move upwardly relative to the weir box, but not downwardly.

5. In a device of the class described, the combination of a weir box, two floats, one in front of the weir box, and one in the rear of it, a frame for rigidly connecting them, and means for adjustably connecting the weir box with said frame.

6. In a device of the class described, the combination of a weir box, two floats, one in front of the weir box, and one in the rear of it, a frame for rigidly connecting them, means for adjustably connecting the weir box with said frame, a weir gate for the weir box, and two independent floats for the weir gate, arranged between the weir box and the forward float.

7. In a device of the class described, the combination of a weir box, a floating support for it, a pipe rotatably connected with one side of the weir box, a discharge box, said pipe being rotatably connected with the side of the discharge box, said pipe also providing communication between the weir box and the discharge box.

8. In a device of the class described, the combination of a weir box, a discharge box, two pipes rotatably connected with the sides of both of said boxes, and providing communication between said boxes.

9. In a device of the class described, the combination of a weir box having openings in its sides, a discharge box having openings in its sides, two pipes arranged parallel with each other, each pipe being connected at each end with one of said boxes by means of tapered collars rotatably connected with each other, and means for adjustably holding said pipes together to form water-tight joints between said collars.

10. In a device of the class described, the combination of a weir box, two floats, a frame rigidly connecting said floats, means for adjustably supporting the weir box from said frame, said weir box having openings in its sides, a discharge box having openings in its sides, two pipes, each rotatably connected at one end with the weir box, and at the other end with the discharge box, and having their central portions substantially parallel with each other, and arranged on opposite sides of one of said floats.

Des Moines, Iowa, Mar. 11, 1908.

HARRY K. FAIRALL.
HOWARD L. FAIRALL.
JOHN R. COOK.

Witnesses:
S. W. NORWOOD,
J. A. INGELHART.